US006989198B2

(12) United States Patent
Masuda et al.

(10) Patent No.: US 6,989,198 B2
(45) Date of Patent: Jan. 24, 2006

(54) MULTI-LAYER STRUCTURE

(75) Inventors: Haruhisa Masuda, Hirakata (JP); Yuji Munesawa, Tsukuba (JP); Koichi Warino, Tsukuba (JP); Tomoharu Nishioka, Ube (JP); Yoshio Iwata, Ube (JP); Koji Nakamura, Ube (JP); Kozo Tamura, Pasadena, TX (US); Tetsuya Hara, Kurashiki (JP)

(73) Assignees: Kuraray Co., Ltd., (JP); Ube Industries, Ltd., (JP)

( * ) Notice: Subject to any disclaimer, the term of this patent is extended or adjusted under 35 U.S.C. 154(b) by 39 days.

(21) Appl. No.: 10/684,743

(22) Filed: Oct. 14, 2003

(65) Prior Publication Data

US 2004/0126523 A1 Jul. 1, 2004

(30) Foreign Application Priority Data

Oct. 29, 2002 (JP) ............................ 2002-315088
Apr. 15, 2003 (JP) ............................ 2003-110736

(51) Int. Cl.
*B32B 27/06* (2006.01)
*B32B 27/34* (2006.01)

(52) U.S. Cl. .............................. 428/474.9; 428/474.7; 428/475.5; 428/475.8; 428/476.1; 428/36.91; 428/35.7; 138/141; 220/562; 220/567.2; 220/586; 220/62.12; 220/DIG. 14; 206/0.6

(58) Field of Classification Search ............... 428/35.7, 428/36.9, 36.91, 474.4, 474.7, 474.9, 475.2, 428/475.5, 475.8, 476.1; 138/140, 141; 220/562, 220/567.2, 586, 62.12, 906, DIG. 14; 206/0.6
See application file for complete search history.

(56) References Cited

U.S. PATENT DOCUMENTS 6,258,927 B1 * 7/2001 Oka et al. ................... 528/310

FOREIGN PATENT DOCUMENTS

EP 1197699 A2 * 4/2002

* cited by examiner

*Primary Examiner*—Michael C. Miggins

(74) *Attorney, Agent, or Firm*—DLA Piper Rudnick Gray Cary US LLP

(57) ABSTRACT

A multi-layer structure excellent in the barrier properties against alcohol gasoline, particularly hydrocarbon components, and also excellent in the interlayer adhesion, low-temperature impact resistance, heat resistance and chemical resistance is provided. The stractive is a multi-layer structure comprising two or more layers including at least a layer (a) comprising (A) nylon 11 and/or nylon 12 and a layer (b) comprising (B) a polyamide resin (nylon 9T) consisting of a dicarboxylic acid component and a-diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine, and preferably further including a layer (c) comprising (A) nylon 11 and/or nylon 12 or (C) nylon 6.

24 Claims, 1 Drawing Sheet

MULTI-LAYER STRUCTURE

BACKGROUND OF THE INVENTION

1. Field of the Invention

The present invention relates to a multi-layer structure obtained by laminating a layer comprising a conventional polyamide-base resin (e.g., nylon 11, nylon 12) and a layer comprising a specific polyamide resin (nylon 9T) consisting of a terephthalic acid and a nonanediamine. More specifically, the present invention relates to a multi-layer structure excellent in a alcohol gasoline permeation-preventing property, interlayer adhesion, low-temperature impact resistance, heat resistance and chemical resistance.

2. Description of Related Art

In-the field of automobile-related fuel tubes, hose, tanks and the like, formation of lightweight constituent parts of an automobile is proceeding and the main material for these parts is changing from metal to resin in view of rusting due to anti-freezing agent on roads or the recent issue of energy saving. For example, a saturated polyester-base resin, a polyolefin-base resin, a polyamide-base resin and a thermoplastic polyurethane-base resin are used. However, a single layer hose using such a resin is insufficient in the heat resistance, chemical resistance and the like and, therefore, the application thereof is limited.

Furthermore, from the standpoint of preventing environmental pollution, strict regulations regarding exhaust gas have been recently implemented and include preventing volatile fuel hydrocarbons, or the like, from leaking out into air by diffusion through a fuel tube, a hose or a tank. The regulations will become more and more strict in the future and it is required to maximally, prevent the fuel from permeating and diffusion through the fuel tube, hose or tank. Also, from the standpoint of reducing gasoline consumption and attaining higher performance, an oxygen-containing gasoline [hereinafter this may be sometimes simply referred to as "alcohol gasoline"] having blended therein an alcohol having a low boiling point, such as methanol and ethanol, or an ether such as methyl-tert-butyl ether (MTBE), is being used. However, the permeation of this fuel cannot be satisfactorily prevented in shaped articles using a conventional polyamide-base resin alone, particularly nylon 11 or nylon 12 which are excellent in the mechanical strength, toughness, chemical resistance and flexibility. Thus, an improvement is required in the prevention, particularly, of alcohol gasoline permeation.

To more successfully prevent the permeation of alcohol gasoline, the wall thickness of fuel tube, hose or tank must be increased, however, this incurs problems that the fuel pipe system decreases in the flexibility or becomes heavy and furthermore, the material or production cost increases.

In order to solve this problem, a multi-layer structure having disposed therein a resin having good alcohol gasoline permeation-preventing property, such as; ethylene-vinyl alcohol copolymer (EVOH), polymethaxylyleneadipamide (nylon MXD6), polybutylene terephthalate (PBT), polyethylene naphthalate (PEN), polybutylene naphthalate (PBN), polyvinylidene fluoride (PVDF), ethylene/tetrafluoroethylene copolymer (ETFE), ethylene/chlorotrifluoroethylene copolymer (ECTFE), tetrafluoroethylene/hexafluoropropylene copolymer (TFE/HFP, FEP) and tetrafluoroethylene/hexafluoropropylene/vinylidene fluoride copolymer (TFE/HFP/VDF, THV), has been proposed (see, for example, International Application Publication No. 93/25835).

The ethylene-vinyl alcohol copolymer (EVOH), polymethaxylyleneadipamide (nylon MXD6) and the like are known to have good adhesive strength to nylon 6, however, the adhesive strength to nylon 11 or nylon 12 which has been conventionally used as a single layer shaped article is insufficient and it is necessary to provide an adhesive layer between layers or apply a specific surface treatment between layers.

Other polyester-base resins and fluororesins are low in the adhesive property to a polyamide resin. Therefore, for example, a technique of using an adhesive resin composition comprising a mixture of a polyester-base resin or fluororesin and a polyamide resin, which are the resins constituting the two layers to be bonded, has been proposed. However, the interlayer adhesion is affected by the morphology of the adhesive resin composition and this gives rise to a problem that the interlayer adhesion is largely dispensed or decreased depending on the production conditions, environmental conditions on use, or the like.

As the adhesive resin, a maleic anhydride-modified polyolefin resin and the like are known. However, these resins are lower in thermal aging resistance than the polyamide resin used and cannot be used in a severe condition. Also, the increase in the number of layers disadvantageously incurs problems in view of cost and process control.

An object of the present invention is to solve these problems and provide a multi-layer structure excellent in the alcohol gasoline permeation-preventing properties and, particularly, hydrocarbon component permeation-preventing properties, and also excellent in the interlayer adhesion, low-temperature impact resistance, heat resistance and chemical resistance.

SUMMARY OF THE INVENTION

As a result of extensive investigations to solve those problems, the present inventors have found that a multi-layer structure obtained by laminating a layer comprising nylon 9T and a layer comprising nylon 11 and/or nylon 12 can exhibit both the interlayer adhesion and the alcohol gasoline permeation-preventing property and furthermore satisfies various properties such as heat resistance and chemical resistance. It has been also found that this multi-layer structure exhibits remarkably high permeation-preventing property particularly for harmful hydrocarbon components in the alcohol gasoline.

More specifically, the present invention relates to a multi-layer structure comprising two or more layers including at least a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine.

The present invention also relates to a multi-layer structure comprising three or more layers including at least a layer (a) comprising (A) nylon 11 and/or nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine, and a layer (c) comprising (A) nylon 11 and/or nylon 12 or (C) nylon 6.

DETAILED DESCRIPTION OF THE INVENTION

Figure 1:
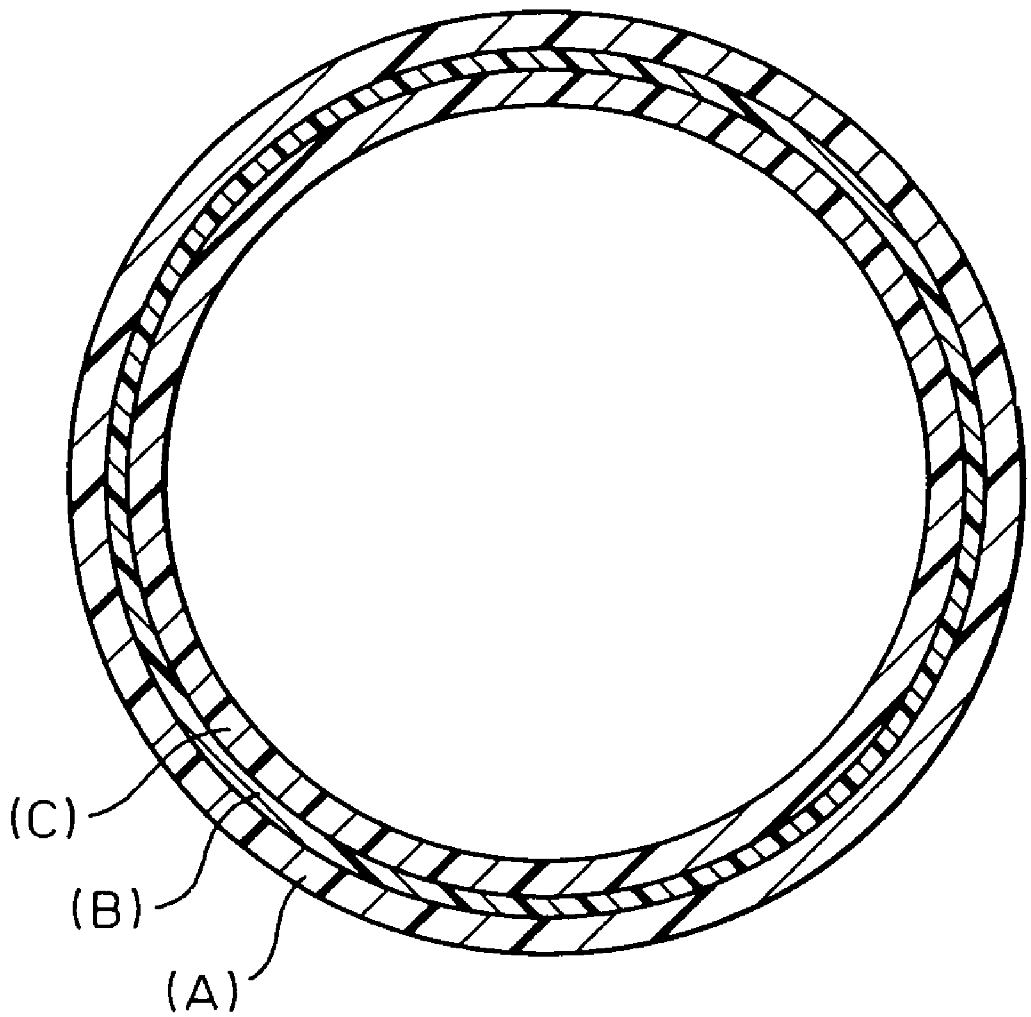
FIG. 1 is a transverse cross-sectional view of a multi-layer tube of Example 1 according to the present invention.

The present invention is described in detail below.

The (A) nylon 11 for use in the present invention is representatively a polyamide represented by the formula: (—CO—$(CH_2)_{10}$—NH—$)_n$, and this polyamide can be obtained by polymerizing 11-aminoundecanoic acid or undecanelactam. The nylon 12 is representatively a polyamide represented by the formula: (—CO—$(CH_2)_{11}$—NH—$)_n$, and this polyamide can be obtained by polymerizing 12-aminododecanoic acid or dodecanelactam.

The (C) nylon 6 for use in the present invention is representatively a polyamide represented by the formula: (—CO—$(CH_2)_5$—NH—$)_n$, and this polyamide can be obtained by polymerizing ε-caprolactam or 6-aminocaprdic acid.

The (A) nylon 11 and/or nylon 12 and nylon 6 each may be a copolymer mainly, comprising the above-described monomer (60 wt % or more). Examples of the copolymerization component include a lactam, an aminocarboxylic acid, and a nylon salt comprising diamine and dicarboxylic acid.

Examples of the lactam include ε-caprolactam (excluding nylon 6), ω-enantholactam, undecanelactam (excluding nylon 11), dodecanelactam (excluding nylon 12), α-pyrrolidone and α-piperidone. Examples of the aminocarboxylic acid include 6-aminocaproic acid (excluding nylon 6), 7-aminoheptanoic acid, 9-aminononanoic acid, 11-aminoundecanoic acid (excluding nylon 11) and 12-aminododecanoic acid (excluding nylon 12).

Examples of the diamine constituting the nylon salt include aliphatic diamines such as ethylenediamine, propylenediamine, 1,4-butanediamine, 1,5-pentanediamine, 1,6-hexanediamine, 1,7-heptanediamine, 1,8-octanediamine, 1,9-nonanediamine, 1,10-decamethylenediamine, 1,11-undecamethylenediamine, 1,12-dodecamethylenediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2/3-methyl-1,5-pentanediamine, 2-methyl-1,8-octanediamine and 2,2,4/2,4,4-trimethyl-1,6-hexanediamine; alicyclic diamines such as 1,3/1,4-cyclohexanediamine, 1,3/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethanamine, 5-amino-1,3,3-trimethylcyclohexanemethanamine, bis(aminopropyl)piperazine, bis(aminoethyl)piperazine, norbornanedimethylamine and tricyclodecanedimethylamine; and aromatic diamines such as p-xylenediamine and m-xylenediamine.

Examples of the dicarboxylic acid constituting the nylon salt include aliphatic dicarboxylic acids such as adipic acid, pimelic acid, suberic acid, azelaic acid, sebacic acid, undecanedionic acid, dodecanedionic acid, tridecanedionic acid, tetradecanedionic acid, pentadecanedionic acid, hexadecanedionic acid, octadecanedionic acid and eicosanedionic acid; alicyclic dicarboxylic acids such as 1,3/1,4-cyclohexanedicarboxylic acid, dicyclohexylmethane-4,4'-dicarboxylic acid and norbornanedicarboxylic acid; and aromatic dicarboxylic acids such as isophthalic acid, terephthalic acid and 1,4/2,6/2,7-naphthalenedicarboxylic acid.

The (A) nylon 11 and/or nylon 12 and (C) nylon 6 for use in the present invention each may be a homopolymer, a mixture with the above-described copolymer, or a mixture with other polyamide resins or other thermoplastic resins. In the mixture, the nylon 11 and/or nylon 12 or nylon 6 content is preferably 60 wt % or more.

Examples of the other polyamide resin include polycapramide (nylon 6), polyundecanamide (nylon 11), polydodecanamide (nylon 12), polyethyleneadipamide (nylon 26), polytetramethyleneadipamide (nylon 46), polyhexamethyleneadipamide (nylon 66), polyhexamethyleneazepamide (nylon 69), polyhexamethylenesebacamide (nylon 610), polyhexamethyleneundecamide (nylon 611), polyhexamethylenedodecamide (nylon 612), polyhexamethyleneterephthalamide (nylon 6T), polyhexamethyleneisophthalamide (nylon 6I), polynonamethylenedodecamide (nylon 912), polydecamethylenedodecamide (nylon 1012), polydodecamethylenedodecamide (nylon 1212), polymethaxylyleneadipamide (nylon MXD6), polytrimethylhexamethyleneterephthalamide (nylon TMHT), polybis(4-aminocyclohexyl)methanedodecamide (nylon PACM12), polybis(3-methyl-4-aminocyclohexyly)methanedtdecamide (nylon dimethyl PACM12), polydecamethyleneterephthalamide (nylon 10T), polyundecamethyleneterephthalamide (nylon 11T), polydodecamethyleneterephthalamide (nylon 12T) and copolymers thereof.

Examples of the other thermoplastic resin include polyolefin-base resins such as high-density polyethylene (HDPE), low-density polyethylene (LDPE), ultrahigh molecular weight polyethylene (UHMWPE), isotactic polypropylene (PP) and ethylene propylene copolymer (EPR); polyester-base resins such as polybutylene terephthalate (PBT), polyethylene terephthalate (PET), polyethylene isophthalate (PEI), PET/PEI copolymer, polyarylate (PAR), polyethylene naphthalate (PEN), polybutylene naphthalate (PBN) and liquid crystal polyester; polyether-base resins such as polyacetal (POM) and polyphenylene oxide (PPO); polysulfone-base resins such as polysulfone (PSF) and polyether sulfone (PES); polythioether-base resins such as polyphenylene sulfide (PPS) and polythioethersulfone (PTES); polyketone-base resins such as polyether ether ketone (PEEK) and polyallyl ether ketone (PEAK); polynitrile-base resins such as polyacrylonitrile (PAN), polymethacrylonitrile, acrylonitrile/styrene copolymer (AS), methacrylonitrile/styrene copolymer, acrylonitrile/butadiene/styrene copolymer (ABS) and methacrylonitrile/styrene/butadiene copolymer (MBS); polymethacrylate-base resins such as polymethyl methacrylate (PMMA) and polyethyl methacrylate; polyvinyl-base resins such as ethylene/vinyl acetate copolymer (EVA), polyvinyl alcohol (PVA), polyvinylidene chloride (PVDC), polyvinyl chloride (PVC), vinyl chloride/vinylidene chloride copolymer and vinylidene chloride/methyl acrylate copolymer; cellulose-base resins such as cellulose acetate and cellulose butyrate; fluororesins such as polyvinylidene fluoride (PVDF), polyvinyl fluoride (PVF), polychlorofluoroethylene. (PCTFE), tetrafluoroethylene/ethylene copolymer (ETFE), ethylene/chlorotrifluoroethylene copolymer (ECTFE), tetrafluoroethylene/hexafluoropropylene copolymer (TFE/HFP, FEP), tetrafluoroethylene/perfluoroalkylether copolymer (PFA) and tetrafluoroethylene/hexafluoropropylene/vinylidene fluoride copolymer (TFE/HFP/VDF, THV); polyimide-base resins such as thermoplastic polyimide (PI), polyamideimide (PAI) and polyether imide (PEI); and thermoplastic polyurethane resin.

In the (A) nylon 11 and/or nylon 12 and (C) nylon 6 for use in the present invention, a plasticizer is preferably added. Examples of the plasticizer include benzenesulfonic acid alkylamides, toluenesulfonic acid alkylamides and hydroxybenzoic acid alkyl esters.

Examples of the benzenesulfonic acid alkylamides include benzenesulfonic acid propylamide, benzenesulfonic acid butylamide and benzenesulfonic acid 2-ethylhexylamide.

Examples of the toluenesulfonic acid alkylamides include N-ethyl-o-toluenesulfonic acid butylamide, N-ethyl-p-toluenesulfonic acid butylamide, N-ethyl-o-toluenesulfonic acid 2-ethylhexylamide and N-ethyl-p-toluenesulfonic acid 2-ethylhexylamide.

Examples of the hydroxybenzoic acid alkyl esters include ethylhexyl o- or p-hydroxybenzoate, hexyldecyl o- or p-hydroxybenzoate, ethyldecyl o- or p-hydroxybenzoate, octyloctyl o- or p-hydroxybenzoate, decyldodecyl o- or p-hydroxybenzoate, methyl o- or p-hydroxybenzoate, butyl o- or p-hydroxybenzoate, hexyl o- or p-hydroxybenzoate, n-octyl o- or p-hydroxybenzoate, decyl o- or p-hydroxybenzoate, and dodecyl o- or p-hydroxybenzoate.

Among these, preferred are benzenesulfonic acid alkylamides such as benzenesulfonic acid butylamide and benzenesulfonic acid 2-ethylhexylamide, toluenesulfonic acid alkylamides such as N-ethyl-p-toluenesulfonic acid butylamide and N-ethyl-p-toluenesulfonic acid 2-ethylhexylamide, and hydroxybenzoic acid alkyl esters such as ethylhexyl p-hydroxybenzoate, hexyldecyl p-hydroxybenzoate and ethyldecyl p-hydroxybenzoate, more preferred are benzenesulfonic acid butylamide, ethylhexyl p-hydroxybenzoate and hexyldecyl p-hydroxybenzoate.

The amount of the plasticizer blended is from 1 to 30 parts by weight, preferably from 1 to 15 parts by weight, per 100 parts by weight of the polyamide resin component. If the amount of the plasticizer blended exceeds 30 parts by weight, the multi-layer structure (for example, fuel pipe tube or hose of an automobile) disadvantageously decreases in the low-temperature impact resistance.

In the (A) nylon 11 and/or nylon 12 and (C) nylon 6 for use in the present invention, an impact resistance improver is preferably added. Examples of the impact resistance improver include rubber-like polymers. Among these, those having a tensile modulus of 5,000 kg/cm$^2$ or less as measured according to ASTM D882 are preferred. If the tensile modulus is higher than this value, the material is improper as the impact resistance improver.

Specific examples of the impact resistance improver include (ethylene and/or propylene)/α-olefin-base copolymers, (ethylene and/or propylene)/(α,β-unsaturated carboxylic acid and/or unsaturated carboxylic acid ester)-base copolymers, ionomeric polymers, and aromatic vinyl compound/conjugated diene compound-base block/copolymers. These polymers can be used individually or as a mixture.

The (ethylene and/or propylene)/α-olefin-base copolymer is a polymer obtained by copolymerizing an ethylene and an α-olefin having 3 or more carbon atoms. Examples of the α-olefin having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and a combination thereof.

Also, a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene, may be copolymerized.

The (ethylene and/or propylene)/(α,β-unsaturated carboxylic acid and/or unsaturated carboxylic acid ester)-base copolymer is a polymer obtained by copolymerizing an ethylene and/or propylene with an α,β-unsaturated carboxylic acid and/or α,β-unsaturated carboxylic acid ester monomer. Examples of the α,β-unsaturated carboxylic acid monomer include an acrylic acid and a methacrylic acid, and examples of the α,β-unsaturated carboxylic acid ester monomer include a methyl ester, an ethyl ester, a propyl ester, a butyl ester, a pentyl ester, a hexyl ester, a heptyl ester, an octyl ester, a nonyl ester and a decyl ester of those unsaturated carboxylic acids, and a mixture thereof.

The ionomeric polymer is a copolymer of an olefin and an α,β-unsaturated carboxylic acid, where at least a part of carboxyl groups are ionized by the neutralization of a metal ions. The olefin is preferably an ethylene and the α,β-unsaturated carboxylic acid is preferably an acrylic acid or a methacrylic acid. However, the ionomeric polymer is not limited thereto and an unsaturated carboxylic acid ester monomer may be copolymerized. Examples of the metal ions include alkali metals and alkaline earth metals, such as Li, Na, K, Mg, Ca, Sr and Ba, and ions such as Al, Sn, Sb, Ti, Mn, Fe, Ni, Cu, Zn and Cd.

The aromatic vinyl compound/conjugated diene compound-base block copolymer is a block copolymer consisting of an aromatic vinyl compound-base polymer block and a conjugated diene-base polymer block. A block copolymer having at least one aromatic vinyl compound-base polymer block and at least one conjugated diene-base polymer block is used. In this block copolymer, an unsaturated bond in the conjugated diene-base polymer block may be hydrogenated.

The aromatic vinyl compound-base polymer block is a polymer block mainly comprising a structural unit derived from in an aromatic vinyl compound. Examples of the aromatic vinyl compound include styrene, α-methylstyrene, o-methylstyrene, m-methylstyrene, p-methylstyrene, 1,3-dimethylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene and 4-(phenylbutyl)styrene. The aromatic vinyl compound-base polymer block may have a structural unit comprising one or more of these monomers. Also, the aromatic vinyl compound-base polymer block may have a slight amount of a structural unit comprising other unsaturated monomers, if desired.

The conjugated diene-base polymer block is a polymer block formed from one or more conjugated diene-base compound such as 1,3-butadiene, chloroprene, isoprene, 2,3-dimethyl-1,3-butadiene, 1,3-pentadiene, 4-methyl-1,3-pentadiene and 1,3-hexadiene. In the hydrogenated aromatic vinyl compound/conjugated diene block copolymer, the unsaturated bond moieties in the conjugated diene-base polymer block are partially or completely hydrogenated to form a saturated bond. The distribution in the polymer block mainly comprising a conjugated diene may be random, tapered or partially blocked or may be an arbitrary combination thereof.

The molecular structure of the aromatic vinyl compound/conjugated diene block copolymer or a hydrogenated product thereof may be linear, branched or radial or may be an arbitrary combination thereof. Among these, as the aromatic vinyl compound/conjugated diene block copolymer and/or a hydrogenated product thereof for use in the present invention, a diblock copolymer-where one aromatic vinyl compound polymer block and one conjugated diene polymer block are linearly bonded, a triblock copolymer where three polymer blocks are linearly bonded in the order of aromatic vinyl compound polymer block-conjugated diene polymer block-aromatic vinyl compound polymer block, and a hydrogenated product thereof are preferably used individually or in combination of two or more thereof. Examples thereof include a styrene/butadiene diblock copolymer or a hydrogenated product thereof, a styrene/isoprene diblock copolymer or a hydrogenated product thereof, a styrene/isoprene/styrene triblock copolymer or a hydrogenated product thereof, a styrene/butadiene/styrene triblock copolymer or a hydrogenated product thereof and a styrene/(isoprene/butadiene)/styrene triblock copolymer or a hydrogenated product thereof.

The (ethylene and/or propylene)/$\alpha$-olefin-base copolymer, (ethylene and/or propylene)/($\alpha$,$\beta$-unsaturated carboxylic acid and/or unsaturated carboxylic acid ester)-base copolymer, ionomeric polymer and aromatic vinyl compound/conjugated diene compound-base block copolymer, which are used as the impact improver, are preferably a polymer modified with a carboxylic acid and/or a derivative thereof. By the modification with such a component, a functional group having affinity for polyamide resin is incorporated into the polymer molecule.

Examples of the functional group having affinity for polyamide resin include a carboxylic acid group, a carboxylic anhydride group, a carboxylic acid ester group, a metal salt of a carboxylic acid group, a carboxylic acid imide group, a carboxylic acid amide group and an epoxy group. Examples of the compound containing such a functional group include acrylic acid, methacrylic acid, maleic acid, fumaric acid, itaconic acid, crotonic acid, methylmaleic acid, methylfurmaric acid, mesaconic acid, citraconic acid, glutaconic acid, cis-4-cyclohexene-1,2-dicarboxylic acid, endo-cis-bicyclo[2,2,1]hept-5-ene-2,3-dicarboxylic acid, metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endo-cis-bicyclo-[2,2,1]hept-5-ene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate.

The amount of the impact resistance improver blended is from 1 to 35 parts by weight, preferably from 5 to 25 parts by weight, more preferably from 7 to 20 parts by weight, per 100 parts by weight of the polyamide resin component. If the amount of the impact resistance improver blended exceeds 35 parts by weight, the mechanical properties inherent to the multi-layer structure (for example, fuel pipe tube or hose of an automobile) are impaired and this is not preferred.

In the multi-layer structure of the present invention, an electrically conducting filler may be blended in the (A) nylon 11 and/or nylon 12 or (C) nylon 6 disposed as an innermost layer. When, for example, a flammable fluid such as gasoline is continuously contacted with an insulator such as resin, an electrostatic charge may be accumulated to cause a fire. The electrical conductivity as used herein means an electrical property to such an extent that an electrostatic charge is not accumulated. The layer using a resin composition imparted with electrical conductivity may be used for any layer of the present invention but is preferably used as an innermost layer. By using the layer as an innermost layer, explosion due to electrostatic charge generated at the transportation of a fluid such as fuel can be prevented.

The electrically conducting filler as used in the present invention includes all fillers which can impart electrically conducting performance to resin and examples thereof include particulate, flaked or fibrous fillers.

Examples of the particulate filler which can be suitably used include carbon black and graphite. Examples of the flaked filler which can be suitably used include aluminum flake, nickel flake and nickel-coated mica. Examples of the fibrous filler which can be suitably used include carbon fiber, carbon-coated ceramic fiber, carbon whisker and metal fiber such as aluminum fiber, copper fiber, brass fiber and stainless steel fiber. Among these, carbon black is most preferred.

The carbon black which can be used in the present invention includes all carbon blacks generally used for imparting electrical conductivity. Preferred examples of the carbon black include, but are not limited to, acetylene black obtained by the complete combustion of acetylene gas, Ketjen black produced by the furnace-type incomplete combustion starting from a crude oil, oil black, naphthalene black, thermal black, lamp black, channel black, roll black and disk black. Among these, acetylene black and furnace black (Ketjen black) are more preferred.

As for the carbon black, various carbon powders differing in the properties such,as particle size, surface area, DBP absorption and ash content are being produced. The carbon black which can be used in the present invention is not particularly limited in these properties, however, those having a good chained structure and a large aggregation density are preferred. In view of impact resistance, the carbon black is preferably not blended in a large amount. In order to obtain excellent electrical conductivity with a smaller amount, the average particle size of carbon black is preferably 500 nm or less, more preferably from 5 to 100 nm, still more preferably from 10 to 70 nm, the surface area (by BET method) is preferably 10 $m^2/g$ or more, more preferably 300 $m^2/g$ or more, still more preferably from 500 to 1,500 $m^2/g$, and the DBP (dibutyl phthalate) absorption is preferably 50 ml/100 g or more, more preferably 100 ml/100 g or more, still more preferably 300 ml/100 g or more. The ash content of carbon black is preferably 0.5% or less, more preferably 0.3% or less. The DBP absorption as used herein means a value measured by the method prescribed in ASTM-D2414. A carbon black having a volatile content of less than 1.0 wt % is more preferred.

The electrically conducting filler may be surface-treated with a surface-treating agent such as titanate-type, aluminum-type or silane-type surface-treating agent. In addition, the electrically conducting filler may be particulated in order to improve the processability of melt kneading with polyamide resin.

The amount of the electrically conducting filler blended varies depending on the kind of electrically conducting filler used and cannot be indiscriminately specified, however, in view of balance of the electrical conductivity with melt-flowability, mechanical strength and the like, the electrically conducting filler in general is preferably blended in an amount of 3 to 30 parts by weight per 100 parts by weight of the polyamide resin component.

For the purpose of obtaining a sufficiently high antistatic performance, the electrically conducting filler is preferably blended in such an amount that the shaped article obtained by melt-extruding a polyamide resin composition containing the electrically conducting filler has a surface resistivity of $10^8$ Ω/square or less, more preferably $10^6$ Ω/square or less. However, the blending of the electrically conducting filler is liable to incur lowering of mechanical strength and melt-flowability and, therefore, if the objective electrical conductivity level can be achieved, the amount of the electrically conducting filler blended is preferably reduced to as small as possible.

In the (A) nylon 11 and/or nylon 12 and (C) nylon 6 for use in the present invention, an antioxidant, a heat stabilizer, an ultraviolet absorbent, a light stabilizer, a lubricant, an inorganic fine particle, an antistatic agent, a flame retardant, a crystallization accelerator and the like may be further added, if desired.

The (A) nylon 11 and/or nylon 12 and (C) nylon 6 can be produced by a known polyamide polymerization method such as melt polymerization, solution polymerization and solid phase polymerization. The production apparatus may be a known polyamide production apparatus such as batch-system reactor, one-bath or multi-bath continuous reaction apparatus, tubular continuous reaction apparatus and kneading reaction extruder (e.g., single-screw extruder, twin-screw extruder). The production of these polyamides can be performed by using a known polymerization method such as melt polymerization, solution polymerization or solid phase polymerization and repeating the operation under atmospheric pressure, reduced pressure or elevated pressure. These polymerization methods can be used individually or in an appropriate combination.

The (A) nylon 11 and/or nylon 12 has a relative viscosity of 1.5 to 4.0, preferably from 2.0 to 3.5, as measured according to JIS K-6920. The (C) nylon 6 has a relative viscosity of 2.0 to 5.0, preferably from 2.5 to 4.5, as measured according to JIS K-6920. If the relative viscosity of (A) nylon 11 and/or nylon 12 and (C) nylon 6 is less than the above-described values, the obtained multi-layer structure may not be satisfied in the mechanical properties, whereas if it exceeds the above-described values, the extrusion pressure or torque becomes excessively high and the multi-layer structure can be hardly produced in some cases.

The polyamide resin constituting the layer (b) of the present invention is preferably a polyamide resin consisting of a dicarboxylic acid component and a diamine component, with 60 to 100 mol % of the carboxylic acid component being a terephthalic acid and 60 to 100 mol % of the diamine component being a diamine component selected from 1,9-nonanediamine and 2-methyl-1,8-octanediamine (hereinafter, this polyamide resin is sometimes simply referred to as "Nylon 9T").

A terephthalic acid is used as the dicarboxylic acid component in the (B) nylon 9T. The amount of the terephthalic acid used is 60 mol % or more, preferably 75 mol % or more, more preferably 90 mol % or more, based on the entire dicarboxylic acid component. If the amount of the terephthalic acid used is less than 60 mol %, the obtained multi-layer structure disadvantageously decreases in various physical properties such as heat resistance and chemical resistance. Examples of the dicarboxylic acid component other than the terephthalic acid include aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid; and an arbitrary mixture thereof. Among these, aromatic dicarboxylic acids are preferred. In addition, a polyvalent carboxylic acid such as trimellitic acid, trimesic acid and pyromellitic acid may also be used in the range of not inhibiting the moldability.

As the diamine component of the (B) nylon 9T, a diamine selected from 1,9-nonanediamine and 2-methyl-1,8-octanediamine is used. The amount of the diamine used is 60 mol % or more, preferably 70 mol % or more, more preferably 80 mol % or more, based on the entire diamine component. When a diamine selected-from 1,9-nonanediamine and 2-methyl-1,8-octanediamine is used as the diamine component in the above-described amount, a multi-layer structure excellent in all of heat resistance, moldability, chemical resistance, low water absorption, lightweightness, dynamic properties and mold-processability is obtained.

The molar ratio of 1,9-nonanediamine and 2-methyl-1,8-octanediamine is preferably from 30:70 to 95:5, more preferably from 40:60 to 90:10.

Examples of the diamine component other than those diamines include aliphatic diamines such as ethylenediamine, propylenediamine, 1,4-butanediamine, 1,6-hexanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine and isophoronediamine; aromatic diamines such as p-phenylenediamine, m-phenylenediamine, p-xylenediamine, m-xylenediamine, 4,4'-diaminodiphenylmethane, 4,4'-diaminodiphenylsulfone, 4,4'-diaminodiphenyl ether; and an arbitrary mixture thereof.

In the (B) nylon 9T, the terminal of its molecular chain is preferably blocked by a terminal-blocking agent. The terminal-blocking agent preferably blocks 40% or more, more preferably 60% or more, still more preferably 70% or more, of the terminal group.

The terminal-blocking agent is not particularly limited as long as it is a monofunctional compound having reactivity with an amino or carboxyl group at the terminal of polyamide. In view of reactivity and stability of the blocked terminal, monocarboxylic acids and monoamines are preferred, and in view of easy handleability, monocarboxylic acids are more preferred. In addition, acid anhydrides, monoisocyanates, monoacid halides, monoesters and monoalcohols may also be used.

The monocarboxylic acid used as the terminal-blocking agent is not particularly limited as long as it has reactivity with an amino group, but examples thereof include aliphatic monocarboxylic acids such as acetic acid, propionic acid, butyric acid, valeric acid, caproic acid, capric acid, lauric acid, tridecylic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and an arbitrary mixture thereof. Among these, in view of reactivity, stability of the blocked terminal and cost, acetic acid, propionic acid, butyric acid, valeric acid, caproic acid, capric acid, lauric acid, tridecylic acid, myristic acid, palmitic acid, stearic acid and benzoic acid are preferred.

The monoamine used as the terminal-blocking agent is not particularly limited as long as it has reactivity with a carboxyl group, but examples thereof include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic amines such as aniline, toluidine, diphenylamine and naphthylamine; and an arbitrary mixture thereof. Among these, in view of reactivity, boiling point, stability of the blocked terminal and cost, butylamine, hexylamine, octylamine, decylamine, stearylamine, cyclohexylamine and aniline are preferred.

The amount of the terminal-blocking agent used for the production of (B) nylon 9T is determined by the intrinsic viscosity [η] of the obtained polyamide resin and the percentage of the terminal groups blocked. Specifically, the amount used is usually from 0.5 to 10 mol % based on the total molar number of dicarboxylic acid component and diamine component, though this varies depending on reactivity and boiling point of the terminal-blocking agent used, reaction apparatus, reaction conditions and the like.

The (B) nylon 9T for use in the present invention preferably has a intrinsic viscosity [η] as measured at 30° C. in concentrated sulfuric acid, of 0.4 to 3.0 dl/g, more preferably from 0.6 to 2.5 dl/g, still more preferably from 0.8 to 2.0 dl/g.

The (B) nylon 9T may be used alone or used as a mixture with other polyamide resins or other thermoplastic resins. In the mixture, the nylon 9T content is preferably 60 wt % or more.

Examples of the other polyamide resin or other thermoplastic resin include the same resins as those described above for the (A) nylon 11 and/or nylon 12 and (C) nylon 6. Furthermore, a mixture with the (A) nylon 11 and/or nylon 12 or (C) nylon 6 for use in the present invention may also be used.

In the (B) nylon 9T, an antioxidant, a heat stabilizer, an ultraviolet absorbent, a light stabilizer, a lubricant, an inorganic filler, an antistatic agent, a flame retardant, a crystallization accelerator, a plasticizer, a colorant, an impact resistance improver and the like may be added, if desired.

The (B) nylon 9T for use in the present invention can be produced by a polyamide polymerization method known as a method for producing a crystalline polyamide. The production apparatus may be a known polyamide production apparatus such as batch-system reactor, one-bath or multi-bath continuous reaction apparatus, tubular continuous reaction apparatus and kneading reaction extruder (e.g., single-screw extruder, twin-screw extruder). The nylon 9T can be produced by using al known polymerization method such as melt polymerization, solution polymerization and solid phase polymerization, and repeating the operation under atmospheric pressure, reduced pressure or elevated pressure. These polymerization methods can be used individually or in an appropriate combination.

For example, a terminal-blocking agent and a catalyst are added all at once to the diamine and dicarboxylic acid to produce a nylon salt. Thereafter, a prepolymer having a intrinsic viscosity [η] of 0.1 to 0.6 dl/g at 30° C. in concentrated sulfuric acid is once produced at a temperature of 280° C. or less and then further subjected to solid phase polymerization or polymerization using a melt-extruder, whereby the polyamide resin of the present invention can be easily obtained. When the intrinsic viscosity [η] of the prepolymer is from 0.1 to 0.6 dl/g, unbalance between carboxyl group and amino group and reduction in the polymerization rate can be suppressed at the later polymerization stage and a polyamide having smaller molecular weight distribution, excellent performances and improved moldability can be obtained. In the case where the final stage of polymerization is performed by the solid phase polymerization, this is preferably performed under reduced pressure or in an inert gas stream and the polymerization temperature is preferably from 180° C. to the temperature below the melting point of polyamide resin obtained by 10° C., because the polymerization proceeds at a high rate to give good productivity and the coloration or gelling can be effectively suppressed. In the case where the final stage of polymerization is performed by using a melt-extruder, the polymerization temperature is preferably 370° C. or less, because the polyamide resin scarcely decomposes and a polyamide resin free of deterioration can be obtained.

Examples of the catalyst include phosphoric acid, phosphorous acid, hypophosphorous acid, and salts and esters thereof, specifically, metal salts such as potassium, sodium, magnesium, vanadium, calcium, zinc, cobalt, manganese, tin, tungsten, germanium, titanium and antimony, ammonium salt, ethyl ester, isopropyl ester, butyl ester, hexyl ester, isodecyl ester, octadecyl ester, decyl ester, stearyl ester and phenyl ester.

The multi-layer structure of the present invention comprises at least two or more layers including a layer (a) comprising (A) nylon 11 and/or nylon 12, and a layer (b) comprising (B) a polyamide resin (nylon 9T) consisting of a dicarboxylic acid component with 60 to 100 mol % of the dicarboxylic acid component being a terephthalic acid, and a diamine component with 60 to 100 mol % of the diamine component being a diamine component selected from 1,9-nonanediamine and 2-methyl-1,8-octanediamine.

In a preferred embodiment, the-multi-layer structure comprises at least three or more layers including a layer (a) comprising (A) nylon 11 and/or nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine, and a layer (c) comprising (A) nylon 11 and/or nylon 12 or (C) nylon 6.

In a more preferred embodiment of the multi-layer structure of the present invention, the layer (a) comprising (A) nylon 11 and/or nylon 12 is disposed as the outermost layer. If a layer comprising a polyamide resin other than the layer comprising (A) nylon 11 and/or nylon 12 is used as the outermost layer, environmental stress cracking may be generated due to an anti-freezing agent on roads.

Also, in the multi-layer structure of the present invention, when the layer (c) comprising (A) nylon 11 and/or nylon 12 or (C) nylon 6 is disposed as the innermost layer, an economically advantageous multi-layer structure having excellent resistance against chemicals and impact can be obtained. Furthermore, in order to prevent ignition of fuel by a spark generated due to internal friction of fuel circulating within a fuel pipe or due to friction between the fuel and the fuel pipe wall, a layer comprising (A) nylon 11 and/or nylon 12 or (C) nylon 6, and having electrical conductivity, is preferably disposed as an innermost layer. At this time, when a layer comprising (A) nylon 11 and/or nylon 12 or (C) nylon 6 and not having electrical conductivity is disposed in the outer layer side with respect to the electrically conducting layer, the low-temperature impact resistance and the electrical conductivity both can be attained and this is advantageous in view of profitability.

In the multi-layer structure of the present invention, a layer (b) comprising (B) nylon 9T must be included. This layer is preferably disposed as an intermediate layer of the multi-layer structure. If the layer (b) comprising (B) nylon 9T is not used, the alcohol gasoline permeation-preventing property of the multi-layer structure is reduced.

In the multi-layer structure of the present invention, the thickness of each layer is not particularly limited and can be controlled according to the kind of polymer constituting each layer, the number of layers in the entire multi-layer structure, use and the like. However, the thickness of each layer is determined by taking into account the properties of the multi-layer structure, such as an alcohol gasoline permeation-preventing property, low-temperature impact resistance and flexibility. In general, the thicknesses of layers (a), (b) and (c) each is preferably from 3 to 90% of the entire thickness of the multi-layer structure and, in view of the alcohol gasoline permeation-preventing property, the thickness of the layer (b) is more preferably from 5 to 80%, still more preferably from 10 to 50%, of the entire thickness of the multi-layer structure.

The number of layers in the entire multi-layer structure of the present invention is not particularly limited and may be any number as long as the multi-layer structure comprises at least two layers including a layer (a) comprising (A) nylon 11 and/or nylon 12 and a layer (b) comprising (B) nylon 9T, preferably at least three or more layers including a layer (a) comprising (A) nylon 11 and/or nylon 12, a layer (b) comprising (B) nylon 9T and a layer (c) comprising (A) nylon 11 and/or nylon 12 or (C) nylon 6. In the multi-layer structure of the present invention, an adhesive layer may be further provided in addition to three layers (a), (b) and (c), so as to enhance the adhesion between layers. Furthermore, one or more layer comprising other thermoplastic resins may be provided together with these three layers. Also, an substrate other than thermoplastic resin, for example, paper, metal-base material, unstretched or uniaxially or biaxially stretched plastic film or sheet, woven fabric, non-woven fabric, metal, cotton or wood, may be multi-layered. Examples of the metal-base material include metals such as aluminum, iron, copper, nickel, gold, silver, titanium, molybdenum, magnesium, manganese, lead, tin, chromium, beryllium, tungsten and cobalt, metal compounds, alloy steels comprising two or more members of these, such as stainless steel, aluminum alloys, hard alloys such as brass and bronze, and alloys such as nickel alloy.

For the adhesive layer, an olefin-base polymer containing a carboxyl group or a salt thereof, an acid anhydride group or an epoxy group is preferably used. Examples of the olefin-base polymer include polyethylene, polypropylene, ethylene-propylene copolymer, an ethylene-butene copolymer, polybutene, an ethylene-propylene-diene copolymer, polybutadiene, a butadiene-acrylonitrile copolymer, polyisoprene and a butene-isoprene copolymer. An olefin-base polymer having copolymerized therein a carboxylic acid ester may also be used and examples thereof include polymers where methyl acrylate, methyl methacrylate, ethyl acrylate, ethyl methacrylate, propyl acrylate, propyl methacrylate, butyl acrylate, butyl methacrylate or the like is copolymerized. Specific examples thereof include olefin-(meth)acrylic acid ester copolymers such as ethylene-methyl acrylate copolymer, ethylene-ethyl acrylate copolymer, ethylene-propyl acrylate copolymer, ethylene-butyl acrylate copolymer, ethylene-methyl methacrylate copolymer, ethylene-ethyl methacrylate copolymer, ethylene-propyl methacrylate copolymer, ethylene-butyl methacrylate copolymer and ethylene-isobutyl methacrylate copolymer, and (meth) acrylic acid ester-acrylonitrile copolymers such as methyl acrylate-acrylonitrile copolymer, methyl methacrylate-acrylonitrile copolymer, propyl acrylate-acrylonitrile copolymer, propyl methacrylate-acrylonitrile copolymer, butyl acrylate-acrylonitrile copolymer and butyl methacrylate-acrylonitrile copolymer.

The polymer may be a copolymer where a carboxyl group or a salt thereof, an acid anhydride group or an epoxy group is introduced into the main chain within the polyolefin molecule, or a graft polymer where such a group is introduced into the side chain.

Examples of the compound containing carboxyl group, salt thereof, acid anhydride group and epoxy group include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-cis-bicyclo[2,2,1]hept-5-ene-2,3-dicarboxylic acid, metal salts (Na, Zn, K, Ca, Mg) of these carboxylic acids, malic anhydride, itaconic anhydride, citraconic anhydride, fumaric anhydride, endo-cis-bicyclo[2,2,1]hept-5-ene-2,3-dicarboxylic anhydride, glycidyl acrylate, glycidyl methacrylate, glycidyl ethacrylate, glycidyl itaconate and glycidyl citraconate.

Examples of the other thermoplastic resin include polyolefin-base resins such as high-density polyethylene (HDPE), low-density polyethylene (LDPE), ultrahigh molecular weight polyethylene (UHMWPE), isotactic polypropylene, ethylene propylene copolymer (EPR), ethylene-vinyl acetate copolymer (EVA), ethylene-vinyl alcohol copolymer (EVOH), ethylene-acrylic acid copolymer (EAA), ethylene-methacrylic acid copolymer (EMAA), ethylene-methyl acrylate copolymer (EMA), ethylene-methyl methacrylate copolymer (EMMA) and ethylene-ethyl acrylate copolymer (EEA); polyester-base resins such as polybutylene terephthalate (PBT), polyethylene terephthalate (PET), polyethylene isophthalate (PEI), PET/PEI copolymer, polyarylate (PAR), polybutylene naphthalate (PBN), polyethylene naphthalate (PEN) and liquid crystal polyester (LCP); polyether-base resins such as polyacetal (POM) and polyphenylene oxide (PPO); polysulfone-base resins such as polysulfone (PSF) and polyether sulfone (PES); polythioether-base resins such as polyphenylene sulfide (PPS) and polythioethersulfone (PTES); polyketone-base resins such as polyether ether ketone (PEEK) and polyallyl ether ketone (PEAK); polynitrile-base resins such as polyacrylonitrile (PAN), polymethacrylonitrile, acrylonitrile/styrene copolymer (AS), methacrylonitrile/styrene copolymer, acrylonitrile/butadiene/styrene copolymer (ABS) and methacrylonitrile/styrene/butadiene copolymer (MBS); polymethacrylate-base resins such as polymethyl methacrylate (PMMA) and polyethyl methacrylate; polyvinyl acetate-base resins such as polyvinyl acetate (PVAc); polyvinyl chloride-base resins such as polyvinylidene chloride (PVDC), polyvinyl chloride (PVC), vinyl chloride/vinylidene chloride copolymer and vinylidene chloride/methyl acrylate copolymer; cellulose-base resins such as cellulose acetate and cellulose butyrate; fluororesins such as polyvinylidene fluoride (PVDF), polyvinyl fluoride (PVF), ethylene/tetrafluoroethylene copolymer (ETFE), polychlorotrifluoroethylene (PCTFE), ethylene/chlorotrifluoroethylene copolymer (ECTFE), tetrafluoroethylene/hexafluoropropylene copolymer (TFE/HFP, FEP) tetrafluoroethylene/perfluoroalloylether copolymer (PFA) and tetrafluoroethylene/hexafluoropropylene/vinylidene fluoride copolymer (TFE/HFP/VDF, THV); polycarbonate-base resins such as polycarbonate (PC); polyimide-base resins such as thermoplastic polyimide (PI), polyamideimide (PAI) and polyether imide (PEI); thermoplastic polyurethane resins; and polyamide-base resins such as polyethyleneadipamide (nylon 26), polytetramethyleneadipamide (nylon 46), polyhexamethyleneadipamide (nylon 66), polyhexamethyleneazepamide (nylon 69), polyhexamethylenesebacamide (nylon 610), polyhexamethyleneundecamide (nylon 611), polyhexamethylenedodecamide (nylon 612), polyhexamethyleneterephthalamide (nylon 6T), polyhexamethyleneisophthalamide (nylon 6I), polynonamethylenedodecamide (nylon 912), polydecamethylenedodecamide (nylon 1012), polydodecamethylenedodecamide (nylon 1212), polymethaxylyleneadipamide (nylon MXD6), polytrimethylhexamethyleneterephthalamide (nylon TMHT), polybis(4-aminocyclohexyl)methanedodecamide (nylon PACM12), polybis(3-methyl-4-aminocyclohexyl)methanedodecamide (nylon dimethyl PACM12), polydecamethyleneterephthalamide (nylon 10T), polyundecamethyleneterephthalamide (nylon 11T), polydodecamethyleneterephthalamide (nylon 12T) and copolymers thereof. Among these, preferred are polyolefin-base resins, polyester-base resins, polyamide-base resins, polythioether-base resins and fluororesins, more preferred are polyolefin-base resins, polyester-base resins, polyamide-base resins and fluororesins, and most preferred are polyolefin-base resins and polyamide-base resins.

The number of layers in the multi-layer structure of the present invention is 2 or more but in view of mechanism of the multi-layer structure producing apparatus, the number of layers is 7 or less, preferably from 2 to 6, more preferably from 3 to 5.

The multi-layer structure of the present invention can be produced into various shapes such as film, sheet, tube or hose, by using a commonly employed thermoplastic resin molding machine such as an extrusion molding machine, a blow molding machine, a compression molding machine or an injection molding machine. An melt molding method such as a co-extrusion molding method (e.g., T-die extrusion, inflation extrusion, blow molding, profile extrusion, extrusion coating) and a multi-layer injection molding method is used.

The shaped article comprising the multi-layer structure of the present invention is used as automobile parts, industrial materials, industrial supplies, electrical and electronic parts, machine parts, office equipment parts, household articles, containers, sheets, films, fibers and other various shaped articles having any purpose and any shape. Specific examples thereof include a fuel pipe tube or hose for automobiles, an automobile radiator hose, a brake hose, an air conditioner hose, a tube such as electric wire covering material and optical fiber covering material, hoses, an agricultural film, a lining, a building interior material (e.g., wall paper), a film of multi-layer steel sheet or the like, sheets, an automobile radiator tank, a liquid chemical bottle, a liquid chemical tank, a bag, a liquid chemical container, and tanks such as gasoline tanks. In particular, the shaped article is useful as a fuel pipe tube or hose for automobiles.

The fuel pipe tube or hose for automobiles is described in detail below.

Examples of the method for producing a fuel pipe, tube or hose for automobiles include a method (co-extrusion method) of melt-extruding materials by using extruders corresponding to the number of layers or number of materials and simultaneously laminating the layers or materials in the inside or outside of the die, and a method (coating method) of once producing a single layer tube or hose or previously producing a multi-layer tube or hose by the above-described production method and then sequentially laminating the resins on the outer side of the tubes or hoses by using, if desired, as adhesive.

In the case where the obtained fuel pipe tube or hose for automobiles has a complicated shape or is formed into a shaped article by applying heat bending after the molding, the formed fuel pipe tube or hose for automobiles may be heat-treated at a temperature lower than the lowest melting point among melting points of, resins constituting the tube or hose for 0.01 to 10 hours to remove the residual strain.

The fuel pipe tube or hose for automobiles-may have an undulation region. The undulation region may be provided over the entire length of the fuel pipe tube or hose for automobiles or may be partially provided in an appropriate middle portion. The undulated region means a region formed to have a shape of wave, bellows, accordion, corrugation or the like. The undulated region can be easily formed by shaping a straight tube and subsequently molding it to have a predetermined undulated shape. By having such an undulated region, an impact-absorbing property is imparted and the fixing operation is facilitated. Furthermore, for example, the fuel pipe tube or hose may be easily attached to the necessary parts such as connector or easily formulated into an L- or U-shaped tube by bending.

By taking account of pebbling, abrasion with other parts and flame resistance, the outer circumference of the shaped fuel pipe tube or hose for automobiles may be entirely or partially provided with a solid or sponge-like protective member (protector) formed of epichlorohydrin rubber, nitrile-butodiene rubber (NBR), a mixture of NBR and polyvinyl chloride, chlorosulfonated polyethylene rubber, chlorinated polyethylene rubber, acrylic rubber (ACM), chloroprene rubber (CR), ethylene-propylene rubber (EPR), ethylene-propylene-diene rubber (EPDM), a mixture rubber of NBR and EPDM, or a thermoplastic elastomer such as vinyl chloride type, olefin type, ester type and amide type. The protective member may be formed as a sponge-like porous material by a known method. By forming as a porous material, a lightweight and highly adiabatic protective part can be provided. Also, the material cost can be reduced. Alternately, the mechanical strength may be improved by adding glass fiber or the like. The shape of the protective member is not particularly limited but a cylindrical member or a block member having a recess for receiving the fuel pipe tube or hose for automobiles is usually used. In the case of a cylindrical member, the fuel pipe tube or hose for automobiles is inserted into a previously prepared cylindrical member [protective member] or a cylindrical member [protective member] is coated by extrusion on the fuel pipe tube or hose for automobiles, so that the cylindrical member [protective member] and the fuel pipe tube or hose for automobiles can be tightly contacted. For bonding the protective member and the fuel pipe tube or hose for automobiles, an adhesive is coated, if desired, on the inner surface or recess surface of the protective member and the fuel pipe tube or hose for automobiles is inserted or fitted thereinto to make them tightly contact with each other, thereby forming a structure where the fuel pipe tube or hose for automobiles and the protective member are integrated. Also, protection by a metal or the like may be applied.

The outer diameter of the fuel pipe tube or hose for automobiles is not limited but in view of flow rate of the fuel (for example, gasoline), the fuel pipe tube or hose for automobiles is designed to have a wall thickness of not increasing gasoline permeability, capable of maintaining the burst pressure at a level, of a normal tube or hose, and capable of maintaining flexibility to such an extent that the tube or hose can be easily fixed and good vibration resistance is ensured in use. Preferably, the outer diameter is from 4 to 30 mm, the inner diameter is from 3 to 25 mm and the wall thickness is from 0.1 to 5 mm.

The multi-layer structure of the present invention is excellent in the heat resistance, chemical resistance, low-temperature impact resistance, alcohol gasoline permeation-preventing properties and interlayer adhesion. Accordingly, the multi-layer structure of the present invention is effective as a film, hose, tube, bottle or tank for use in automobile parts, industrial materials, industrial supplies, electrical and electronic parts, machine parts, office equipment parts, household articles and containers. The multi-layer structure of the present invention is particularly useful as a fuel pipe tube or hose for automobiles.

EXAMPLES

The present invention is described in greater detail below by referring to Examples and Comparative Examples, however, the present invention is not limited thereto.

In Examples and Comparative Examples, the analysis and measurement of physical properties were performed as follows.

[Relative Viscosity]

The relative viscosity was measured according to JIS K-6920 in 96% sulfuric acid under the conditions that the polyamide concentration was 1% and the temperature was 25° C.

[Intrinsic Viscosity]

The inherent viscosity ($\eta_{inh}$) of samples having a concentration of 0.05, 0.1, 0.2 or 0.4 g/dl was measured at 30° C. in concentrated sulfuric acid and a value obtained by extrapolating the measured value to the concentration 0 was used as an intrinsic viscosity [η].

$$\eta_{inh}=[ln(t_1/t_o)]/c$$

wherein $\eta_{inh}$ represents an inherent viscosity (dl/g), $t_o$ represents a flow-down time (sec) of solvent, $t_1$ represents a flow-down time (sec) of sample solution, and c represents a concentration (g/dl) of a sample in solution.

[Evaluation of Physical Properties]

(Low-Temperature Impact Resistance of Tube)

This was evaluated by the method described in SAE J2260.

(Alcohol Gasoline Permeation-Preventing Property)

One end of a tube cut to 200 mm was plugged, alcohol/gasoline obtained by mixing Fuel C (isooctane/toluene=50/50 by volume) and ethanol at a volume ratio of 90/10 was charged into the inside, and the other end was also plugged. Thereafter, the entire weight was measured, then the test tube was placed in an oven at 60° C., the change in weight was measured and the fuel permeability was evaluated.

(Analysis of Fuel Permeated Components)

The fuel permeated components were analyzed by gas chromatography, the amount of each fuel component (toluene, isooctane or ethanol) was determined and the total amount of toluene and isooctane was identified as the amount of HC (hydrocarbon) permeated.

(Interlayer Adhesion)

The tube cut into 200 mm was further cut into a half in the longitudinal direction to prepare a test piece. The test piece was subjected to a 180° peel test at a peeling speed of 50 mm/min by using a Tensilon universal tester. The peel strength was read from the peak of S—S curve and the interlayer adhesion was evaluated.

[Materials Used in Examples and Comparative Examples]

(A) Nylon 12

(A-1) Production of Nylon 12 Resin Composition

JSR T7712SP (produced by JSR corporation) as an impact resistance improver was mixed with UBESTA3030U (Nylon 12 resin; produced by Ube Industries, Ltd., relative viscosity: 2.27). While supplying the mixture to a twin-screw melt-kneading machine (manufactured by Japan Steel Works, Ltd., Model: TEX44), benzenesulfonic acid butylamide as a plasticizer was fed by a quantitative pump in the middle of the cylinder of the twin-screw melt-kneading machine and melt-kneaded at a cylinder temperature of 180 to 260° C. The resulting melt was extruded into a water tank as a strand, cooled, cut in pellets and then vacuum-dried to give pellets of a nylon 12 resin composition comprising 85 wt % of nylon 12 resin, 10 wt % of impact resistance improver and, 5 wt % of plasticizer (hereinafter, this nylon 12 resin composition is referred to as (A-1)).

(A-2) Production of Nylon 12 Resin Composition

Pellets of a nylon 12 resin composition comprising 90 wt % of nylon 12 resin and 10 wt % of impact resistance improver were obtained in the same manner as in the production method of (A-1) except for not using a plasticizer (hereinafter, this nylon 12 resin composition is referred to as (A-2)).

(A-3) Production of Nylon 12 Resin Composition

Pellets of a nylon 12 resin composition comprising 70 wt % of nylon 12 resin, 20 wt % of impact resistance improver and 10 wt % of electrically conducting filler were obtained in the same manner as in the production method of (A-1) except for changing UBESTA3030U to UBESTA3020U (Nylon 12 resin; produced by Ube Industries, Ltd., relative viscosity: 1.86), using Ketjen Black EC600JD (produced by Akzo Nobel K.K.) and not using a plasticizer (hereinafter, this nylon 12 resin composition is referred to as (A-3)).

(B) Nylon 9T (B-1) Production of Nylon 9T

An autoclave was changed with 32,927 g (198.2 mol) of terephthalic acid, 26,909 g (170 mol) of 1,9-nonanediamine, 4,748.7 g (30 mol) of 2-methyl-1,8-octanediamine, 439.6 g (3.6 mol) of benzoic acid, 60 g of sodium hypophosphite monohydrate (0.1 wt % based on raw material) and 40 liter of distilled water, and the atmospheres of the autoclave was replaced by nitrogen.

The contents were stirred at 100° C. for 30 minutes and the internal temperature was increased to 210° C. over 2 hours. At this time, the pressure within the autoclave was increased to 22 kg/cm$^2$. In this state, the reaction was continued for 1 hour and then the temperature was increased to 230° C. Thereafter, the temperature was kept at 230° C.

for 2 hours and the reaction was performed while keeping the pressure at 22 kg/cm$^2$ by gradually extracting the water vapor. Subsequently, the pressure was decreased to 10 kg/cm$^2$ over 30 minutes and the reaction was further performed for 1 hour to obtain a prepolymer having an intrinsic viscosity [η] of 0.25 dl/g. This prepolymer was dried at 100° C. for 12 hours under reduced pressure, ground to a size of 2 mm or less and then subjected to solid phase polymerization at 230° C. and 0.1 mmHg for 10 hours to obtain nylon 9T having a melting point of 306° C. and an intrinsic viscosity [η] of 1.45 dl/g (hereinafter this nylon 9T resin is referred to as (B-1)).

(B-2) Production of Nylon 9T

Nylon 9T having a melting point of 265° C. and an intrinsic viscosity [η] of 1.43 dl/g was obtained in the same manner as in (B-1) Production of Nylon 9T except that in (B-1) Production of Nylon 9T, 26,909 g (170 mol) of 1,9-nonanediamine was changed to 15,829 g (100 mol) and 4,748.7 g (30 mol) of 2-methyl-1,8-octanediamine was changed to 15,829 g (100 mol) (hereinafter this nylon 9T resin is referred to as (B-2)).

(C) Nylon 6

C-1) Production of Nylon 6 Resin Composition

JSR T7712SP (produced by JSR Corporation) as an impact resistance improver was mixed with UBE Nylon 1024B (Nylon 6 resin; produced by Ube Industries, Ltd., relative viscosity: 3.50). While supplying the mixture to a twin-screw melt-kneading machine (manufactured by Japan Steel Works, Ltd., Model: TEX44), benzenesulfonic acid butylamide as a plasticizer was fed by a quantitative pump in the middle of the cylinder of the twin-screw melt-kneading machine and melt-kneaded at a cylinder temperature of 230 to 270° C. The resulting melt was extruded into a water tank as a strand, cooled, cut in pellets and then vacuum-dried to give pellets of a nylon 6 resin composition comprising 75 wt % of nylon 6 resin, 10 wt % of impact resistance improver and 15 wt % of plasticizer (hereinafter, this nylon 6 resin composition is referred to as (C-1)).

(C-2) Production of Nylon 6 Resin Composition

Pellets of a nylon 6 resin composition comprising 70 wt % of nylon 6 resin and 30 wt % of impact resistance improver were obtained in the same manner as in the production method of (C-1) except for not using a plasticizer (hereinafter, this nylon 6 resin composition is referred to as (C-2)).

(C-3) Production of Nylon 6 Resin Composition

Pellets of a nylon 6 resin composition comprising 60 wt % of nylon 6 resin, 30 wt % of impact resistance improver, 5 wt % of plasticizer and 5 wt % of electrically conducting filler were obtained in the same manner as in the production method of (C-1) except for changing UBE Nylon 1024B to UBE Nylon 1015B (Nylon 6 resin; produced by Ube Industries, Ltd., relative viscosity: 2.64) and using Ketjen Black EC600JD (produced by Akzo Nobel K.K.) (hereinafter, this nylon resin composition is referred to as (C-3)).

(D) Adhesive Resin (D-1) Modified polyolefin resin

UBond F1100 produced by Ube Industries, Ltd.

(E) Nylon MXD6 (polymethaxylyieneadipamidie)

(E-1) MXD6

MX6011 produced by Mitsubishi Gas Chemical Company, Inc.

(F) ETFE (ethylene/tetrafluordethylene copolymer)

(F-1) PA12·ETFE Adhesive

EA-LR43 produced by PAIKIN INDUSTRIES, LTD.

(F-2) ETFE

EP-610 produced by PAIKIN INDUSTRIES, LTD.

Example 1

In a three-layer tube molding machine manufactured by Research Laboratory of Plastics technology Co., Ltd., (A) Nylon 12 (A-1), (B) Nylon 9T (B-1) and (C) Nylon 6 (C-1) were separately melted at an extrusion temperature of 250° C. for (A), 330° C. for (B) and 260° C. for (C) and the melted resins extruded were joined by an adapter to form a three-layered multi-layer tubular body. The obtained multi-layer tubular body was cooled by a sizing die capable of controlling the dimension and then taken up by a roll to obtain a multi-layer tube having an inner diameter of 6 mm and an outer diameter of 8 mm and having a layer structure of the layer (a) (outermost layer) comprising (A) nylon 12, the layer (b) (intermediate layer) comprising (B) nylon 9T and the layer (c) (innermost layer) comprising (C) nylon 6, wherein the thickness of the layers (a), (b) and (c) were 0.375 mm, 0.25 mm and 0.375 mm, respectively. The obtained multi-layer tube was measured on the physical, properties and the results are shown in Table 1.

Example 2

A multi-layer tube having an inner diameter of 6 mm and an outer diameter of 8 mm and having a layer structure shown in Table 1 was obtained id the same manner as in Example 1 except for changing (B) Nylon 9T (B-1) to (B-2). The obtained multi-layer tube was measured on the physical properties and the results are shown in Table 1.

Example 3

A multi-layer tube having an inner diameter of 6 mm and an outer diameter of 8 mm and having a layer structure shown in Table 1 was obtained in the same manner as in Example 1 except for changing (C) Nylon 6 (C-1) to (C-2). The obtained multi-layer tube was measured on the physical properties and the results are shown in Table 1.

Example 4

A multi-layer tube having an inner diameter of 6 mm and an outer diameter of 8 mm and having a layer structure shown in Table 1 was obtained in the same manner as in Example 2 except for changing (A) Nylon 12 (A-1) to (A-2). The obtained multi-layer tube was measured on the physical properties and the results are shown in Table 1.

Example 5

A multi-layer tube having an inner diameter of 6 mm and an outer diameter of 8 mm and having a layer structure shown in Table 1 was obtained in the same manner as in Example 2 except for changing (C) Nylon 6 (C-1) to (C-3). The obtained multi-layer tube was measured on the physical properties and the results are shown in Table 1. Furthermore, the electrical conductivity of the obtained multi-layer tube was measured according to SAE J-2260 and found to be $10^6$ Ω/square or less, indicating an excellent destaticizing performance.

Example 6

A multi-layer tube having an inner diameter of 6 mm and an outer diameter of 8 mm and having a layer structure shown in Table 1 was obtained in the same manner as in Example 2 except for changing (C) Nylon 6 (C-1) to (A) Nylon 12 (A-1). The obtained multi-layer tube was measured on the physical properties and the results are shown in Table 1.

Example 7

A multi-layer tube having an inner diameter of 6 mm and an outer diameter of 8 mm and having a layer structure shown in Table 1 was obtained in the same manner as in Example 2 except for changing (C) Nylon 6 (C-1) to (A) Nylon 12 (A-3). The obtained multi-layer tube was measured on the physical properties and the results are shown in Table 1. Furthermore, the electrical conductivity of the obtained multi-layer tube was measured according to SAE J-2260 and found to be $10^6$ Ω/square or less, indicating an excellent destaticizing performance.

Example 8

In a four-layer tube molding machine manufactured by Research Laboratory of Plastics Technology Co., Ltd., (A) Nylon 12 (A-1), (B) Nylon 9T (B-2), (C) Nylon 6 (C-1) and (C) Nylon 6 (C-3) were separately melted at an extrusion temperature of 250° C. for (A), 330° C. for (B) and 270° C. for (C) and the melted resins extruded were joined by an adapter to form a four-layered multi-layer tubular body. The obtained multi-layer tubular body was cooled by a sizing die capable of controlling the dimension and then taken up by a roll to obtain a multi-layer tube having an inner diameter of 6 mm and an outer diameter of 8 mm and having a layer structure of the layer (a) (outermost layer) comprising (A) nylon 12, the layer (b) (intermediate layer) comprising (B) nylon 9T, the layer (c) (inner layer) comprising (C) Nylon 6 (C-1) and the layer (c') (innermost layer) comprising (C) Nylon 6 (C-3), wherein the thickness of the layeres (a), (b), (c) and (c') were 0.45 mm, 0.25 mm, 0.15 mm and 0.15 mm, respectively. The obtained multi-layer tube was measured on the physical properties and the results are shown in Table 1. Furthermore, the electrical conductivity of the obtained multi-layer tube was measured according to SAE J-2260 and found to be $10^6$ Ω/square or less, indicating an excellent destaticizing performance.

Example 9

A multi-layer tube having an inner diameter of 6 mm and an outer diameter of 8 mm and having a layer structure shown in Table 1 was obtained in the same manner as in Example 8 except for changing (C) Nylon 6 (C-1) to (A) Nylon 12 (A-1) and changing (C) Nylon 6 (C-3) to (A) Nylon 12 (A-3). The obtained multi-layer tube was measured on the physical properties and the results are shown in Table 1.

Example 10

In a two-layer tube molding machine manufactured by Research Laboratory of Plastics Technology Co., Ltd., (A) Nylon 12 (A-1) and (B) Nylon 9T (B-2) were separately melted at an extrusion temperature of 250° C. for (A) and 330° C. for (B) and the melted resins extruded were joined by an adapter to form a two-layered multi-layer tubular body. The obtained multi-layer tubular body was cooled by a sizing die capable of controlling the dimension and then taken up by a roll to obtain a multi-layer tube having an inner diameter of 6 mm and an outer diameter of 8 mm and having a layer structure of the layer (a) (outermost layer) comprising (A) nylon 12 and the layer (b) (intermediate layer) comprising (B) nylon 9T, wherein the thickness of the layers (a) and (b) were 0.75 mm and 0.25 mm, respectively. The obtained multi-layer tube was measured on the physical properties and the results are shown in Table 1.

Comparative Example 1

A multi-layer tube having an inner diameter of 6 mm and an outer diameter of 8 mm and having a layer structure of the layer (a) [outermost layer] comprising (A) nylon 12, the layer (c) [inner most layer] comprising (C) nylon 6 and the layer (d) [intermediate layer] comprising (D) adhesive resin, wherein the thickness of the layers (a), (d) and (c) were 0.60 mm, 0.10 mm and 0.30 mm, respectively, was obtained in the same manner as in Example 1 except for changing (B) Nylon 9T (B-1) to (D) Adhesive Resin (D-1) and separately meting the resins at an extrusion temperature of 250° C. for (A), 260° C. for (C) and 190° C. for (D). The obtained multi-layer tube was measured on the physical properties and the results are shown in Table 1.

Comparative Example 2

A multi-layer tube having an inner diameter of 6 mm and an outer diameter of 8 mm and having a layer structure shown in Table 1 was obtained in the same manner as in Example 1 except for changing (A) Nylon 12 (A-1) to (C) Nylon 6 (C-1). The obtained multi-layer tube was measured on the physical properties and the results are shown in Table 1.

Comparative Example 3

A multi-layer tube having an inner diameter of 6 mm and an outer diameter of 8 mm and having a layer structure of the layers (c) [outermost and innermost layers] comprising (C) nylon 6 and the layer (e) [intermediate layer] comprising (E) nylon MXD6 resin, wherein the thickness of layers (c) and (E) were 0.375 mm and 0.25 mm, respectively, was obtained in the same manner as in Comparative Example 2 except for changing (B) Nylon 9T (B-1) to (E) Nylon MXD6 (E-1) and separately melting the resins at an extrusion temperature of 260° C. for (C) and 280° C. for (E). The obtained multi-layer tube was measured on the physical properties and the results are shown in Table 1.

Comparative Example 4

A multi-layer tube having an inner diameter of 6 mm and an outer diameter of 8 mm and having a layer structure of the layer (a) [outermost layer] comprising (A) nylon 12, the layer (c) [innermost layer] comprising (C) nylon 6 and the layer (e) [intermediate layer] comprising (E) nylon MXD6 resin, wherein the thickness of layers (a), (c) and (e) were 0.375 mm, 0.25 mm and 0.375 mm, respectively, was obtained in the same manner as in Comparative Example 3 except for changing (C) Nylon 6 (C-1) to (A) Nylon 12 (A-1) and separately melting the resins at an extrusion temperature of 250° C. for (A), 260° C. for (C) and 280° C.

for (E). The obtained multi-layer tube was measured on the physical properties and the results are shown in Table 1.

Comparative Example 5

A multi-layer tube having an inner diameter of 6 mm and an outer diameter of 8 mm and having a: layer structure of the layer (a) [outermost layer] comprising. (A) nylon 12, the layer (f) [intermediate layer] comprising (F) PA12·ETFE Adhesive (F-1) and the layer (f) [innermost layer] comprising (F) ETFE (F-2), wherein the thickness of layers (a), (f) [F-1] and (f) [F-2] were 0.75 mm, 0.10 mm and 0.15 mm, respectively was obtained in the same manner as in Example 1 except for changing (B) Nylon 9T (B-1) to (F)-PA12 ETFE Adhesive (F-1), changing (C) Nylon 6 (C-1) to (F) ETFE (F-2) and separately melting the resins at an extrusion temperature of 250° C. for (A), 260° C. for (F-1) and 295° C. for (F-2). The obtained multi-layer tube was measured on the physical properties and the results are shown in Table 1.

nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine, and a layer (c) comprising (A) nylon 11 and/or nylon 12 or (C) nylon 6, wherein said layer (a) and said layer (b) directly contact and are bonded to each other.

4. The multi-layer structure as claimed in claim 3, wherein said layer (c) comprising (A) nylon 11 and/or nylon 12 or (C) nylon 6 is the innermost layer.

5. The multi-layer structure as claimed in claim 3, wherein said layer (b) comprising (B) nylon 9T is an intermediate layer.

6. The multi-layer structure as claimed in claim 1 or 3, wherein said layer (a) comprising (A) nylon 11 and/or nylon 12 is the outermost layer.

TABLE 1

| | Outermost Layer | | Intermediate Layer | | Inner Layer | | Innermost Layer | | Low-Temperature Impact Resistance (number of ruptured | Amount of Fuel Permeated/ | Peel |
|---|---|---|---|---|---|---|---|---|---|---|---|
| | Kind | Thickness [mm] | Kind | Thickness [mm] | Kind | Thickness [mm] | Kind | Thickness [mm] | tubes/number of tested tubes) | Amount of HC ($g/m^2 \cdot day$) | Strength (N/cm) |
| Example 1 | A-1 | 0.375 | B-1 | 0.25 | — | — | C-1 | 0.375 | 0/10 | 18/1.6 | 38 |
| Example 2 | A-1 | 0.375 | B-2 | 0.25 | — | — | C-1 | 0.375 | 0/10 | 20/1.8 | 41 |
| Example 3 | A-1 | 0.375 | B-1 | 0.25 | — | — | C-2 | 0.375 | 0/10 | 23/1.8 | 40 |
| Example 4 | A-2 | 0.375 | B-2 | 0.25 | — | — | C-1 | 0.375 | 0/10 | 19/1.7 | 43 |
| Example 5 | A-1 | 0.45 | B-2 | 0.25 | — | — | C-3 | 0.3 | 0/10 | 22/1.8 | 40 |
| Example 6 | A-1 | 0.375 | B-2 | 0.25 | — | — | A-1 | 0.375 | 0/10 | 25/2.2 | 45 |
| Example 7 | A-1 | 0.45 | B-2 | 0.25 | — | — | A-3 | 0.3 | 0/10 | 26/2.1 | 42 |
| Example 8 | A-1 | 0.45 | B-2 | 0.25 | C-1 | 0.15 | C-3 | 0.15 | 0/10 | 21/2.0 | 44 |
| Example 9 | A-1 | 0.45 | B-2 | 0.25 | A-1 | 0.15 | A-3 | 0.15 | 0/10 | 29/2.3 | 40 |
| Example 10 | A-1 | 0.75 | — | — | — | — | B-2 | 0.25 | 0/10 | 24/2.1 | 42 |
| Comparative Example 1 | A-1 | 0.6 | D-1 | 0.1 | | | C-1 | 0.3 | 0/10 | 75/20 | 50 |
| Comparative Example 2 | C-1 | 0.375 | B-1 | 0.25 | | | C-1 | 0.375 | 10/10 | 17/1.5 | 40 |
| Comparative Example 3 | C-1 | 0.375 | E-1 | 0.25 | | | C-1 | 0.375 | 10/10 | 26/1.5 | 69 |
| Comparative Example 4 | A-1 | 0.375 | E-1 | 0.25 | | | C-1 | 0.375 | 5/10 | 30/1.8 | 2 |
| Comparative Example 5 | A-1 | 0.75 | F-1 | 0.1 | | | F-2 | 0.15 | 0/10 | 14/7.2 | 15 |

The invention claimed is:

1. A multi-layer structure comprising two or more layers including at least a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-methyl-1,8-octanediamine, wherein said layer (a) and said layer (b) directly contact and are bonded to each other.

2. The multi-layer structure as claimed in claim 1, wherein the layer (b) further comprises at least one additive selected from the group consisting of an antioxidant, a heat stabilizer, an ultraviolet absorbent, a light stabilizer, a lubricant, an inorganic filler, an antistatic agent, a flame retardant, a crystallization accelerator, a plasticizer, a colorant and an impact resistance improver.

3. A multi-layer structure comprising three or more layers including at least a layer (a) comprising (A) nylon 11 and/or

7. The multi-layer structure as claimed in claim 1 or 3, wherein the innermost layer has electrical conductivity.

8. The multi-layer structure as claimed in claim 1 or 3, wherein said each layers are co-extruded layers.

9. A shaped article comprising the multi-layer structure claimed in claims 1 to 3, which is selected from the group consisting of a film, a hose, a tube, a bottle and a tank.

10. The multi-layer structure according to claim 1 or 3, which does not comprise a metal layer.

11. The multi-layer structure as claimed in claim 1 or 3, wherein the layer (b) further comprises at least one aliphatic diamine selected from the group consisting of ethylenediamine, propylenediamine, 1,4-butanediamine, 1,6-hexanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine and isophoronediamine; aromatic diamines such as p-phenylenediamine, m-phenylenediamine, p-xylenediamine, m-xylenediamine, 4,4'-diaminodiphenylmethane, 4,4'-diaminodiphenylsulfone, and 4,4'-diaminodiphenyl ether.

12. The multi-layer structure as claimed in claim 1 or 3, wherein the layer (b) further comprises at least one other polyamide resin or thermoplastic resin.

13. The multi-layer structure as claimed in claim 1 or 3, wherein the nylon 9T further comprises a terminal blocking agent.

14. The multi-layer structure as claimed in claim 13, wherein the terminal blocking agent is at least one of monocarboxylic acids and monoamines.

15. The multi-layer structure as claimed in claim 14, wherein the monocarboxylic acids are selected from the group consisting of aliphatic monocarboxylic acids, alicyclic monocarboxylic acids, aromatic monocarboxylic acids and mixtures thereof.

16. The multi-layer structure as claimed in claim 14, wherein the monoamine is selected from the group consisting of aliphatic monoamines, alicyclic monoamines, aromatic amines and mixtures thereof.

17. A multi-layer structure consisting of a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-metyl-1,8-octanediamine, wherein said layer (a) and said layer (b) are directly contacted and bonded with each other.

18. A multi-layer structure consisting of two or more polymer layers, said polymer layers comprising a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-metyl-1,8-octanediamine.

19. A multi-layer structure consisting of three or more polymer layers, said polymer layers comprising a layer (a) comprising (A) nylon 11 and/or nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-metyl-1,8-octanediamine, and a layer (c) comprising (A) nylon 11 and/or nylon 12 or (C) nylon 6.

20. The multi-layer structure according to claim 18 or 19, wherein said layer (a) is the outermost layer.

21. A multi-layer structure consisting of a layer (a) comprising (A) nylon 11 and/or nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonandiamine and 2-metyl-1,8-octanediamine, and one or more thermoplastic resin layers.

22. A multi-layer structure consisting of a layer (a) comprising (A) nylon 11 and/or nylon 12, a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonandiamine and 2-metyl-1,8-octanediamine, a layer (c) comprising (A) nylon 11 and/or nylon 12 or (C) nylon 6, and one or more thermoplastic resin layers.

23. An automobile fuel pipe comprising two or more layers including at least a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-metyl-1,8-octanediamine, wherein said layer (a) and said layer (b) are directly contacted and bonded with each other.

24. An automobile fuel pipe comprising three or more layers including at least a layer (a) comprising (A) nylon 11 and/or nylon 12, and a layer (b) comprising (B) a polyamide resin (nylon 9T) consisting of a dicarboxylic acid component and a diamine component, with 60 to 100 mol % of the dicarboxylic acid component being a terephthalic acid and 60 to 100 mol % of the diamine component being a diamine component selected from 1,9-nonanediamine and 2-metyl-1,8-octanediamine, and a layer (c) comprising (A) nylon 11 and/or nylon 12 or (C) nylon 6, wherein said layer (a) and said layer (b) are directly contacted and bonded with each other.

* * * * *